United States Patent
Betouin et al.

(10) Patent No.: US 8,200,727 B2
(45) Date of Patent: Jun. 12, 2012

(54) METHOD AND APPARATUS FOR VERIFYING AND DIVERSIFYING RANDOMNESS

(75) Inventors: Pierre Betouin, Fontenay-le-Fleury (FR); Mathieu Ciet, Paris (FR); Augustin J. Farrugia, Cupertino, CA (US); Gianpaolo Fasoli, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1155 days.

(21) Appl. No.: 12/031,552

(22) Filed: Feb. 14, 2008

(65) Prior Publication Data

US 2009/0208014 A1     Aug. 20, 2009

(51) Int. Cl.
  *G06F 1/02*   (2006.01)
  *G06F 11/30*  (2006.01)
(52) U.S. Cl. ........................................ 708/250; 713/194
(58) Field of Classification Search .............. 380/28–30, 380/255–283; 713/150–154, 160–167, 194; 708/250–256
See application file for complete search history.

(56) References Cited

U.S. PATENT DOCUMENTS

| 6,606,709  | B1 * | 8/2003  | Connery et al. | 726/14  |
| 6,947,960  | B2 * | 9/2005  | Hars           | 708/250 |
| 7,295,674  | B2 * | 11/2007 | Hars           | 380/286 |
| 2003/0200239 | A1 * | 10/2003 | Hars        | 708/250 |
| 2004/0128517 | A1 * | 7/2004  | Drews et al.| 713/180 |
| 2008/0209227 | A1 * | 8/2008  | Venkatesan et al. | 713/186 |

* cited by examiner

Primary Examiner — Chuong D Ngo
(74) Attorney, Agent, or Firm — Morrison & Foerster LLP

(57) ABSTRACT

Method and apparatus for ensuring randomness of pseudo-random numbers generated by a conventional computer operating system or electronic device. Typically pseudo-random number generators used in computer operating systems or electronic devices may be penetrated by a hacker (pirate), who penetrates a cryptographic or other supposedly secure process using the random numbers by tampering with the input random numbers, thus making them nonrandom. The present method and apparatus are intended to verify such random numbers to make sure that they are indeed random enough, by applying suitable random tests. Only if the values pass the test are they passed on for use in the cryptographic or other process. If they fail the test, a new set of random numbers is requested from the pseudo-random number generator. These are again tested. Further a diversity function may be applied to the random numbers even if they have passed the random number test in order to improve their randomness. This diversity function is for instance double encryption. An anti-replay feature is also included by which the pool of random numbers is subject to a check on each cycle to make sure that there has been no duplication of the input random numbers.

33 Claims, 3 Drawing Sheets

| Macro | Type | Comments |
|---|---|---|
| FPTR_POOL_SIZE | Integer | Size of the random pool. Need to fill some requirements (minSize, maxSize...). |
| FPTR_MAX_REPLAY_HASH_NB | Integer | Number of stored hashes to avoid replay attacks. |
| FPTR_MANDATORY_ENCRYPTION_BLOCK | Boolean | When true, FPTR will always branch into the encryption blocks. |
| FPTR_STAT_TEST_MONOBIT | Handler | Used as 3rd argument macro for FPTRGetBytes testFn handler. |
| FPTR_STAT_TEST_POKER | Handler | Used as 3rd argument macro for FPTRGetBytes testFn handler. |

*FIG. 2*

METHOD AND APPARATUS FOR VERIFYING AND DIVERSIFYING RANDOMNESS

FIELD OF THE INVENTION

This invention relates generally to computer and electronic device data security and more specifically to random numbers used in cryptographic processes and elsewhere.

BACKGROUND

Generation of random numbers is a well known problem in the data security and cryptographic field for example. Random numbers are used for instance to generate challenges, perform cryptographic operations such as generate initialization vectors (IV), generate session encryption and decryption keys, and other purposes. For purposes of this disclosure, each of these exemplary applications and others such as use of random numbers in Smartcards is generally referred to as a "cryptographic process". As well known, generating truly random numbers is rather difficult or impossible using computer enabled (software) methods. Most computer operating systems generate numbers referred to as "random" by means of a pseudo-random number generator (PRNG) which may be in hardware or software. Hence these numbers are considered pseudo-random. For purpose of this disclosure, pseudo-random and true random are both generally referred to as "random". Use of random numbers generated by a computer operating system pseudo-random number generator is quite desirable for use in cryptographic systems since otherwise the cryptographic process must itself generate the random numbers internally, thus duplicating a function already available in the underlying computer operating systems.

However it is known that for an attacker (pirate or hacker) who wishes to attack a cryptographic or other random number-using process, use of such random numbers generated by an operating system or other random number generator can lead to security breaches. There are number of ways for a hacker to perform such attacks. Some of these are referred to as "hooking", which in computer science is a technique employing so-called hooks to make a chain of procedures an event handler. Thus, after the handled event occurs, control flow follows the chain in specific order. The new hook registers its own address as handler for the event and is expected to call the original handler at some point. Hooking is used by hackers to inject potentially malicious code into an event handler. Some types of hooking employ intercepting library function calls made by a process. One types of hooking used to penetrate the security of cryptographic systems is Import Address Table (IAT) hooking. Tools are published on the Internet which allow to do this, for instance to attack various operating systems. For instance there are well known API (Application Programming Interface) spying utilities for exploring the inter-structure of software applications (programs) and operating systems. Another method is DLL (Dynamic Link Library) hooking or patching. Another method is known as kernel hooking. Another method is modifying the pseudo-random number generator behavior in the operating systems. All of these allow the hacker to generate values from the operating system which appear to be random, but in fact are known or partially known to the hacker. By thus inputting a known "random" value to the cryptographic process, it makes it easier to extract the keys of the cryptographic process or otherwise penetrate its security using a known input-type attack. For instance, clear-cipher attacks consist of recovering an algorithm, keys, or other cryptographic element and analyzing the output for a known input. Thus the availability of hooking in combination with the use of random numbers generated by an operating system leads to a weakness in cryptographic processes.

SUMMARY

In accordance with this disclosure, a method and apparatus are provided whereby conventionally generated random numbers before being used in a cryptographic or other process are tested to make sure that they are indeed random (more precisely pseudo-random in most embodiments, but not necessarily). Hence this is intended to avoid and detect random number (value) tampering by a hacker such as by distribution and repartition hooks. Note that the alternative of implementing a pseudo-random number generator as a secure part of the cryptographic process is not considered any more secure since even then certain input/output accesses are needed and there are typically calls for external APIs (Application Programming Interface). Hence the present approach is believed to be superior to implementing a "secure" pseudo-random number generator. The present method includes accepting the conventional generated random values and then checking them inside a secure boundary (processing environment) for the validity of the random values (degree of randomness). That is, one applies tests to determine randomness. In one embodiment, the method and apparatus implement statistical tests to insure that the supplied values represented as being random numbers are indeed random enough. Also in one embodiment, anti-replay protection is provided as another security enhancement. The actual randomness test(s) used may be those known in the art or others, as described further below.

BRIEF DESCRIPTION OF THE DRAWINGS

FIG. 2 shows variables and parameters for the FIG. 1 method.

DETAILED DESCRIPTION

Figure 1:
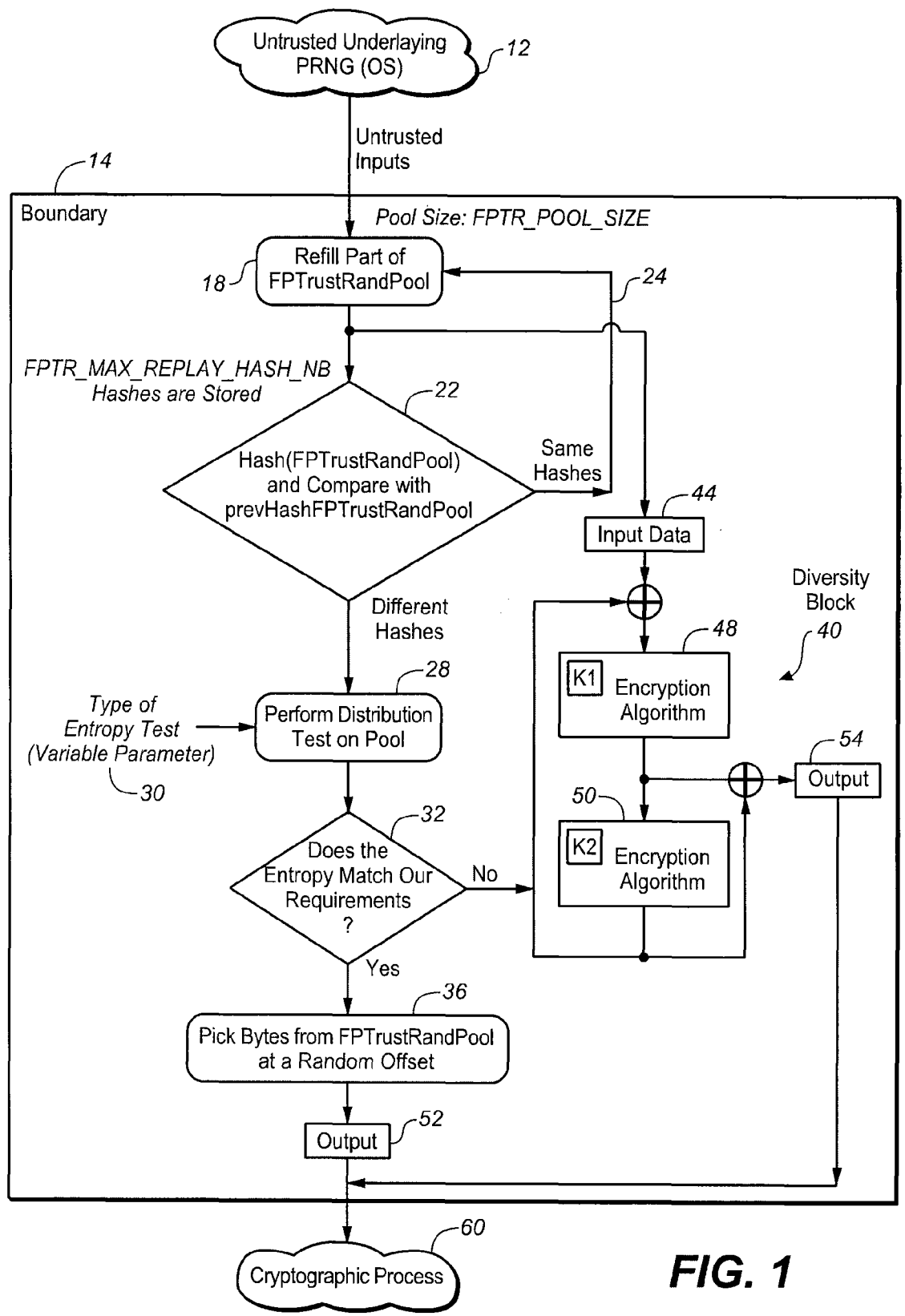
FIG. 1 shows in a flowchart a method in accordance with this disclosure.

In one embodiment, the present method and apparatus avoid and detect randomness tampering, that is verify for randomness, using a computer-enabled function (typically embodied in computer software expressed in the C language at a high level) as follows:

```
SInt32 FPTRGet Bytes (    UInt8    *buffer,
                          UInt32   len,
                          SInt32   (*testFn) (UInt8 *buffer, UInt 32 len));
```

This method checks random numbers generated by an operating system inside a secure computing or processing boundary or environment for the randomness of the generated values. In one embodiment, this is part of or operates with a DRM (Digital Rights Management) system, of the type well known. An example of a Digital Rights Management system is FairPlay from Apple Inc. This is used in the Apple iPod and related products to protect digital (audio and video or other binary) content. It uses cryptographic processes and other data security methods. Some of the cryptographic processes require use of random numbers and hence the output of the present method, which is a verified random number, may be input into a conventional or other cryptographic process (here generally referring to DRM or other data security schemes) with the knowledge that the tested random number is indeed random enough for the intended purpose.

More specifically than in the high level C-language embodiment shown above, first in this process there is an initialization step for the random number verification. There are three alternatives for initialization. In the first initialization alternative, a fixed pool or set of random values obtained from the operating system pseudo-random number generator is stored in a buffer (memory). Stored along with these values is the corresponding pre-computed hash value of these random numbers. Hash is a one-way function, as well known in the field, which is applied to a set of values to generate from that a resulting value. The resulting value is characteristic of the input values; however, one cannot recovery the input values from the hash value since this is a one-way function. The hash is thus used to characterize a set of values in this case. The second initialization alternative initializes the received pool of random numbers and generates the corresponding hash without using the pre-computation. A third alternative is a combination of the first two solutions where the initial pool is a function of both the first alternative static data (the fixed pool with corresponding pre-computed hash) and the second alternative dynamic data which is computed dynamically. Using this third alternative, embedded data is stored into the memory (buffer) and the dynamic input data is used as an initialization seed. In this case, an initialization value is a function of a static value (data) and dynamic data. If the dynamic data has been tampered with, this is detectable. This third alternative is regarded as more secure against hackers since it tends to prevent or detect hooking. Note that the second alternative is generally less secure, although it uses less buffer memory. This is because its first initialization could well be faked by a hacker. Note that the first alternative also requires post-processing to store the pool of random values since this alternative stores the precomputed hash values in memory, with the corresponding random data.

In the next phase, the DRM, such as FairPlay, queries (calls) the random number verification process to obtain a random number, also referred to here as a set of random bytes. Data in the computer field is typically partitioned into bytes, each of which is typically 8 bits of binary data. However this is merely illustrative. The pool of random numbers is maintained in the memory and is updated each time random bytes are needed. Usually only the previously used part of the pool is updated with new random bytes sourced from the operating system pseudo-random number generator. This helps obfuscate the overall process, that is it improves security and also hides from a hacker the exact random bytes used by the DRM caller function. Note that the pool size may be variable. There may be more than one pool. Also, the update may be of more than just the used bytes of the pool. In one embodiment to enhance security, the DRM caller function calls the values from a non-deterministic offset of the pool. In other words, instead of always taking the first or last value in the pool, each time a value is to be extracted from the pool of random values, another random number is generated to determine which entry in the pool is to be taken. For instance, if there are 100 random values in the pool (buffer), one generates a random number between 0 and 99 and thus chooses from the pool the corresponding numbered entry in the pool. This further enhances security. The offset may be actually computed in the pool of random numbers several calls ahead. When updating the pool an entropy (random) test and anti-replay test are launched on the entire content of the pool for each update as explained further below.

The entropy (randomness) test or tests are performed on the pool each time it is updated to ensure that the returned values from the pool as initially supplied by the operating system are random enough. Note that pseudo-random numbers are inherently not actually random. However for cryptographic purposes, a certain level of pseudo-randomness is acceptable. There are a wide variety of such tests available as described below. Some of these require a large amount of data or a large number of computations. Thus the present method may use a suitable test or series of tests depending on the level of security needed. To improve functionality, the test function is provided in one embodiment embedded in a handler. (A handler in computer science is an asynchronous callback subroutine. Handlers are well known in the computer science field as a way of modularizing and improving performance of software.) The randomness test(s) may be inlined in terms of code execution and is included within the present secure processing boundary or environment. Note the two most computationally intensive parts of the present process are the entropy test(s) and the diversity function explained below. Thus in order to improve functionality and improve performance both the entropy test(s) and the diversity function are provided using a handler. One or more randomness tests may be applied in each cycle.

Also provided in the present method is a diversity function. This is intended to hide from a hacker the output random bytes used inside the secure boundary. In one embodiment, this diversity function is conditional and in another it is mandatory. In the conditional embodiment, only when the random number tests are failed, that is there is inadequate randomness found in the pool, the diversity function is applied to the returned value. Typically the diversity function is a double encryption function. Thereby the final output random values cannot be known by a hacker. The nature of the diversity function depends on the level of security provided. In one embodiment, the diversity function is a double encryption, which is a well known diversity technique. Alternative diversity functions include single encryption, with a secret key. Typically the single or double encryption may be performed using a symmetric or asymmetric cipher of types well known.

Advantages of the present approach include removing dependence on the operating system architecture, since the present process can be provided as an API. Also security is heightened because the reliability of the output of the operating system pseudo-random number generator will be highly improved compared to that of a conventional approach.

FIG. 1 shows in a flowchart the above-described C language method in more detail. As shown at the top, an underlying pseudo-random number generator (PRNG) 12 is present in the operating system (OS) or electronic device with which the present DRM process is associated. This operating system is any type, such as an Apple Macintosh operating system type, a Microsoft Windows operating system type, UNIX type or Linux, or others including those used in embedded electronic devices. Typically in this case in cryptographic terminology, the operating system and its PRNG is considered "untrusted." (But this is not limiting.) That is the operating system may have been penetrated by a hacker using a hooking or other hacking technique as described above. Hence the goal of the present method is to verify the output of this untrusted pseudo-random number generator to make sure the returned pseudo-random numbers have not been tampered with. Hence upon a request from the DRM, a random number is generated and input into the present secure boundary process 14.

The security of boundary 14 may be accomplished in a number of known ways. For instance this may be obfuscated code, a tamper-proof processor and memory, or other well known ways of providing security. This secure environment may be embodied in a consumer electronics device such as the Apple iPod, iPhone, or Apple TV or a personal computer, all available to the public, including hackers. Hence the secure boundary 14 must be secure against tampering by a user who has physical access to the device.

In the first step 18 within the secure boundary 14, one accepts the untrusted pseudo-random number and thus refills the random value pool referred to here as FPTrust RandPool ("FP" refers to FairPlay in this example). The size of the pool is indicated being a variable pool size referred to as FPTR_POOL_SIZE. In other words, one is topping up the stored pool of random numbers. Typically a certain number of random bytes are kept in the pool at any one time, such as 100.

In the next step 22, a one-way (e.g., hash) function Hash is applied as shown to the pool. (Use of a hash function is exemplary. Any one-way function and collision free function can be used, including a keyed function.) This hash function is a hash function of all the values in the pool. This can be any one of the well known types of hash functions, such as MAC, MD2, MD3, MD4, MD5, Snefru, SHA, SHA-1, SHA-2, N-hash, RIPE-MD, HAVAL, or others. The present hash function expressed logically as Hash (FPTrustRandPool) is compared at 22 with the previously computed hash function prevHash (FPTrust RandPool) which is a list of the last FPTR_MAX_REPLAY_HASH_NB hashes generated from the FPTrustRandPool content, each previous hash function value being also stored in a hash memory. The comparison provides an anti-replay function at 24. That is if two such stored hashes are the same (match), clearly there has been tampering since that means that two input random values were identical with a very high probability. The point here is to detect tampering. Thus if the same hash value is detected, one returns to step 18 and refills the pool FPTrustRandPool since the present pool is regarded as insecure. Typically at least ten pool hashes are stored where the number of hashes is referred to as is FPTR_MAX_REPLAY_HASH_NB, and all are compared at each cycle 22. If any two hashes match at 24, this indicates a replay or tampering problem and hence the pool must be again refilled.

If however the hash test is passed at 22, that is the computed hashes are indeed different among for instance the ten stored hashes, execution passes to the next step 28 to perform a distribution (randomness) test on the pool. The distribution test, also known as an entropy test or randomness test, may vary from time to time or embodiment to embodiment as controlled by a variable parameter. Randomness tests are well known in the field. "Entropy" here is a synonym for randomness. The entropy of value X is generally the uncertainty about the outcome before an observation of X. In other words, entropy is a measure of the amount of unpredictable information there is in a data source. The point in producing useful randomness is to have sufficient entropy that the randomness is generally random. Given adequate entropy one can use it as a source for future random value needs by generating pseudo-random numbers from a cryptographic pseudo-random number generator. A cryptographic or secure pseudo-random number generator is one that cannot have its internal state recovered from its output by any method more efficient than brute force. This randomness is typically achieved by using a set of encryption and hash functions. (This is conventional information theory.)

Examples of well known randomness tests include the ordinary runs test (the number of consecutive similar bytes), the sign test, the runs up and down test, the Mann-Kendall test, the Bartels' rank test and the test based on entropy estimators. Other tests are the monobit test (whether there are equal numbers of ones and zeros in the sequence), the poker test (a special instance of a chi-squared test), the longruns test, and the autocorrelation test. Combining the results of various such tests provides an even better test, in other words improves the confidence of randomness of a given sequence. Any of these individually or combinations thereof or other known random tests may be used here. The more tests applied to the pool and the more extensive each test, the greater the confidence. Hence test selection is a design decision depending on the degree of security needed and as indicated above may be controlled by a variable parameter 30. In the next step 32 it is determined, does the tested entropy match the requirements that has the applied randomness test (or tests) been passed? In this case, entropy is not expressed as a value, but merely whether certain tests have been passed or failed.

In the event of the entropy being adequate at 32 ("Yes"), that is the test or tests have been passed, execution passes to the next step 36 to select bytes from the pool using a random offset of the values in the pool. That is, assume the 100 values in the pool as explained above are numbered entries 0 through 99. The random offset is a random number from 0 to 99 which is generated and then applied to the value selection to determine which value in the pool is to be output next. This offset improves security. The selected bytes (random value) are then output at 52 to the cryptographic process 60 as explained above, which is outside the secure boundary's or tests).

In the event the entropy match fails at 32 ("No"), that is the randomness test (or tests) is not passed, control then proceeds to the diversity block 40 shown in the right hand portion of FIG. 1. As shown, the diversity block receives values in the pool as inputs at 44 and applies, in this case, a double encryption algorithm at blocks 48, 50 including encryptions K1 and K2 respectively. The encryption 48, 50 is typically for instance a conventional cipher such as AES, DES, or RSA. It is well known that double encryption provides enhanced entropy or randomness. The double encrypted (diversified) value is then used as the output value at 54 as shown. In some embodiments rather than only applying the diversity function conditionally if the entropy match fails, one applies the diversity function to each output value (and thereby makes it mandatory). This further enhances security, but slows down processing.

Values and parameters used in the method of FIG. 1 are shown in FIG. 2 in tabular form as a set of software (code) macros. The comments explain the significance of each variable or parameter. In this case the two randomness tests applied are the monobit test (FPTR_STAT_TEST_MONOBIT) and the poker test (FPTR_STAT_TEST_POKER). Each of these is a handler type. (The diversity block may also be a handler.)

Figure 3:
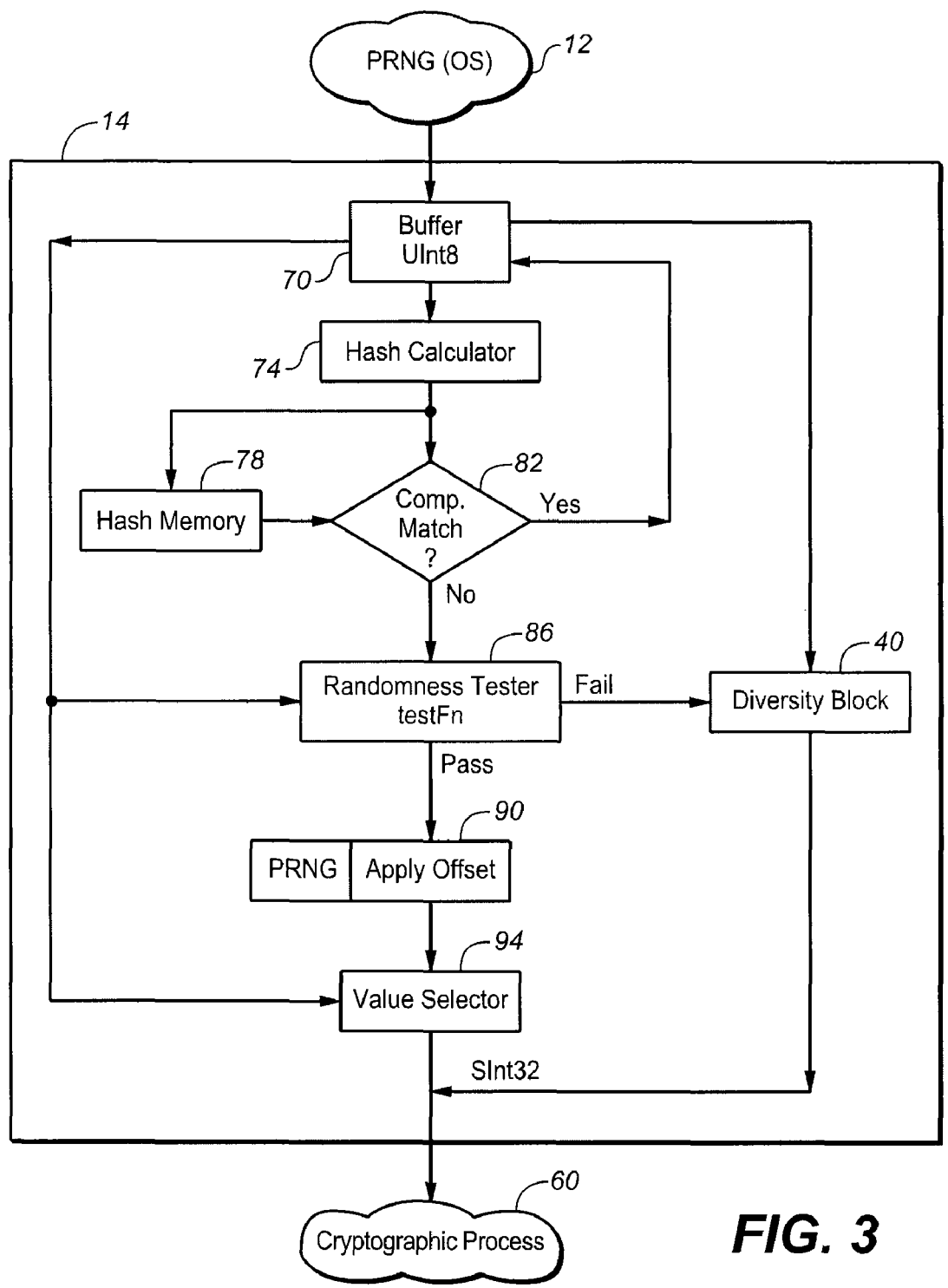
FIG. 3 shows an apparatus for carrying out the FIG. 1 method.

FIG. 3 shows an apparatus corresponding to the FIG. 1 method. It is understood that typically the method of FIG. 1 is carried out by computer software or hardware (including in an electronic device such as an integrated circuit). Hence FIG. 3, while shown as an apparatus, may be a set of computer operations or modules. This may also be embodied all or in part by firmware or circuitry. As shown, the random values input from the operating system 12, which is not part of the present apparatus and is outside the secure boundary 14, are stored in a buffer (memory) 70 which stores the pool of received random values. The length of this buffer is indicated logically by the value SInt32=UInt32 len. len refers to the (unsigned) length of each entry stored in the buffer which is for instance 1 byte. That is, each input random value is 1 byte long here. The number of entries in the pool, that is the number of value entries which the buffer holds, is indicated in FIG. 2 as being FPTR_POOL_SIZE, which is an (unsigned) integer.

Coupled to the buffer 70 is a hash function calculator 74. Calculator 74 computes a hash value of the entire contents of the buffer using one of the above-described hash (or other one-way) functions. A hash memory 78 stores each previous hash value, for instance up to ten consecutive hashes. Both the hash function calculator 74 and the hash memory 78 are coupled to a comparator 82 which compares the currently computed hash function to each of those stored in the hash memory. If there is a match, this means the hash test has failed and control returns to replenish the buffer 70 from the operating system 12 PRNG. If the hashes pass the hash comparison test at 82, next the randomness tester 86 is applied. Tester 86 carries out the various tests indicated above one or more which may be selected by the system designer or changed dynamically.

Connected to the randomness tester is the offset applier 90. Applier 90 includes a random number generator PRNG which generates an offset value which is then applied to the value selector 94. The value selector selects a particular value SInt32, depending on the offset value, from the buffer 70 (pool). After the selection that value SInt32 is returned, that is output to the cryptographic process 60. However if the random test fails at 86 as indicated above, instead the diversity block 40, also indicated in FIG. 1, is then invoked which is connected to the random tester 86. The diversity function of the diversity block 40 is then applied to the particular value SInt32 and the resulting output of the diversity block is then used as the output SInt32. The diversity block 40 is also connected to buffer 70 to accept the random values therefrom.

Note that typically while the present method and apparatus may be embodied in computer software or firmware for instance of the type conventionally stored in a computer-readable medium and executed by a computer processor or equivalent, in actual usage this is compiled (object) code rather than source code, as is conventional. Moreover, since this code must be secure, that is within the secure boundary, it should have adequate security applied to it such as code obfuscation and other conventional code protection techniques.

This description is illustrative but not limiting. Further modifications will be apparent to those skilled in the art in light of this disclosure and are intended to fall within the scope of the appended claims.

We claim:

1. A method to verify randomness of a received value, comprising the acts of:
   receiving a plurality of values generated by a computer operating system or electronic device at an input port;
   storing the received values in a computer memory;
   computing a one-way function of the stored values at a calculator circuit;
   comparing the computed one-way function with at least one one-way function of previously stored values at a comparator circuit;
   if the comparison does not match, apply at least one randomness test to the stored values;
   if the randomness test is passed, selecting one value of the stored values; and
   transmitting the selected value to a process at an output port; wherein
   if the comparison results in a match, replacing at least one of the stored values with another random value generated by the operating system; and
   returning to the act of computing a one-way function of the stored values.

2. The method of claim 1, wherein if the randomness test is failed, further comprising the acts of:
   applying a diversity function to the plurality of stored values; and
   returning to applying the at least one randomness test to the result of the diversity function.

3. The method of claim 2, wherein the diversity function is invoked by a handler.

4. The method of claim 2, wherein the diversity function includes single encryption or double encryption.

5. The method of claim 4, wherein the encryption includes applying a symmetric or asymmetric cipher.

6. The method of claim 1, where the randomness test is selected from the group consisting of: monobit, poker, runs, sign, runs up and down, Mann-Kendall, Bartel's rank, entropy estimator, long runs and auto correlation.

7. The method of claim 1, further comprising the act of applying an offset when selecting the value.

8. The method of claim 7, wherein the offset is generated by a random process.

9. The method of claim 1, wherein the randomness test is invoked by a handler.

10. The method of claim 1, further comprising the acts of:
    rendering a length of each of the received values as a variable; and
    assigning a length to the variable.

11. The method of claim 1, wherein the operating system is a Macintosh-type, Windows-type, UNIX-type, or Linux-type.

12. The method of claim 1, wherein the method is performed within a secure processing environment.

13. The method of claim 12, wherein the received random values are untrusted by the secure processing environment.

14. The method of claim 1, wherein the one-way function is MAC, MD2, MD3, MD4, MD5, Snefru, SHA, SHA-1, SHA-2, N-hash, RIPE-MD, or HAVAL.

15. The method of claim 1, wherein the act of applying at least one randomness test further comprises applying a second randomness test to the stored values.

16. The method of claim 1, wherein the random values are pseudo-random.

17. A computer readable medium storing computer code for carrying out the method of claim 1.

18. A computer enabled apparatus for verifying randomness of a value, comprising:
    an input port for receiving values;
    a storage coupled to the input port and which stores the received values;
    a calculator coupled to the storage and which computes a one-way function of the stored values;
    a one-way function storage coupled to the calculator and which stores a plurality of previously computed one-way functions;
    a comparator coupled to the calculator and one-way function storage to determine a match there between;
    a randomness tester coupled to the storage and to the comparator, and which if the comparison does not match, applies at least one randomness test to the stored values;

a value selector, coupled to the randomness tester and the storage and which selects one of the stored values if the randomness test is passed; and an output port coupled to the value selector to output the selected value.

19. The apparatus of claim 18, wherein if the randomness test is failed, further comprising:

applying a diversity function to the received values; and applying the at least one randomness test to the result of the diversity function.

20. The apparatus of claim 19, wherein the diversity function is invoked by a handler.

21. The apparatus of claim 19, wherein the diversity function includes single encryption or double encryption.

22. The apparatus of claim 21, wherein the encryption includes applying a symmetric or asymmetric cipher.

23. The apparatus of claim 18, where the randomness test is selected from the group consisting of:

monobit, poker, runs, sign, runs up and down, Mann-Kendall, Bartel's rank, entropy estimator, long runs and auto correlation.

24. The apparatus of claim 18, further comprising applying an offset when selecting the stored value.

25. The apparatus of claim 24, wherein the offset is generated by a random process.

26. The apparatus of claim 18, wherein the randomness tester is invoked by a handler.

27. The apparatus of claim 18, further comprising:

rendering a length of each of the received values as a variable; and assigning a length to the variable.

28. The apparatus of claim 18, wherein the received values are provided from an operating system which is a Macintosh-type, Windows-type, UNIX-type, or Linux-type.

29. The apparatus of claim 18, wherein the apparatus defines a secure processing environment.

30. The apparatus of claim 29, wherein the received values are untrusted by the secure processing environment.

31. The apparatus of claim 18, wherein the one-way function is MAC, MD2, MD3, MD4, MD5, Snefru, SHA, SHA-1, SHA-2, N-hash, RIPE-MD, or HAVAL.

32. The apparatus of claim 18, wherein the randomness tester applies a second randomness test to the values.

33. The apparatus of claim 18, wherein the received values are pseudo-random.

* * * * *